(12) United States Patent
Fujita

(10) Patent No.: US 11,821,483 B2
(45) Date of Patent: Nov. 21, 2023

(54) ELECTRIC MOTOR CONTROL DEVICE AND BRAKE DEVICE

(71) Applicant: HITACHI AUTOMOTIVE SYSTEMS, LTD., Hitachinaka (JP)

(72) Inventor: Haruhiko Fujita, Machida (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 85 days.

(21) Appl. No.: 16/981,794

(22) PCT Filed: Feb. 20, 2019

(86) PCT No.: PCT/JP2019/006210
§ 371 (c)(1),
(2) Date: Sep. 17, 2020

(87) PCT Pub. No.: WO2019/187806
PCT Pub. Date: Oct. 3, 2019

(65) Prior Publication Data
US 2021/0095733 A1 Apr. 1, 2021

(30) Foreign Application Priority Data
Mar. 27, 2018 (JP) .................................. 2018-060443

(51) Int. Cl.
*H02P 29/60* (2016.01)
*F16D 66/00* (2006.01)
(Continued)

(52) U.S. Cl.
CPC ............. *F16D 66/00* (2013.01); *F16D 65/18* (2013.01); *F16D 2066/001* (2013.01); *F16D 2121/24* (2013.01)

(58) Field of Classification Search
CPC .... F16D 2066/001; F16D 66/00; F16D 65/18; F16D 2121/24; F16D 2125/582;
(Continued)

(56) References Cited

U.S. PATENT DOCUMENTS

2007/0235268 A1* 10/2007 Caron ................... F16D 65/568
188/71.8
2008/0236964 A1* 10/2008 Kikuchi ................. H02K 11/33
188/162
(Continued)

FOREIGN PATENT DOCUMENTS

JP 641991 A * 1/1989
JP 10-100913 4/1998
(Continued)

OTHER PUBLICATIONS

International Search Report dated May 28, 2019 in International (PCT) Application No. PCT/JP2019/006210 with English-language translation.
(Continued)

*Primary Examiner* — Nicholas J Lane
*Assistant Examiner* — Stephen M Bowes
(74) *Attorney, Agent, or Firm* — Wenderoth, Lind & Ponack, L.L.P.

(57) ABSTRACT

An electric motor control device includes a control board that controls the driving of an electric motor and temperature detecting portions disposed on the control board at least at two locations that differ in temperature change tendency.

3 Claims, 2 Drawing Sheets

(51) Int. Cl.
*F16D 65/18* (2006.01)
*F16D 121/24* (2012.01)

(58) Field of Classification Search
CPC ...... F16D 2129/10; H02P 29/60; H02P 29/64; H02P 29/66
See application file for complete search history.

(56) References Cited

U.S. PATENT DOCUMENTS

| | | | |
|---|---|---|---|
| 2013/0285587 A1* | 10/2013 | Takemoto | B62D 5/0496 318/473 |
| 2013/0293033 A1* | 11/2013 | Bass | G05D 23/1917 307/651 |
| 2015/0102756 A1* | 4/2015 | Okita | H02P 29/02 318/473 |
| 2017/0104439 A1 | 4/2017 | Kobayashi et al. | |

FOREIGN PATENT DOCUMENTS

| | | |
|---|---|---|
| JP | 2006-341795 | 12/2006 |
| JP | 2017-73898 | 4/2017 |
| JP | 2017-210031 | 11/2017 |
| SU | 1278626 A * | 12/1986 |

OTHER PUBLICATIONS

International Preliminary Report on Patentability and Written Opinion of the International Searching Authority dated May 28, 2019 in International (PCT) Application No. PCT/JP2019/006210 with English-language translation.

* cited by examiner

ELECTRIC MOTOR CONTROL DEVICE AND BRAKE DEVICE

TECHNICAL FIELD

The invention relates to an electric motor control device and a brake device using an electric motor.

BACKGROUND ART

For example, Patent Literature 1 discloses a control device of an electric power steering device that estimates motor winding temperature from terminal-to-terminal voltage in a motor and a motor current detection value and then protects motor temperature on the basis of the motor winding temperature.

CITATION LIST

Patent Literature

PTL 1: Japanese Unexamined Patent Application Publication (Kokai) No. 10-100913

SUMMARY OF INVENTION

Technical Problem

According to the temperature estimation method disclosed in Patent Literature 1, it is necessary to measure terminal-to-terminal resistance in the motor at reference temperature with respect to each product and store the measured values in a non-volatile memory portion. Such a method incurs an increase in the number of steps of manufacturing process and therefore an increase in manufacturing cost.

Solution to Problem

An object of the invention is to provide an electric motor control device capable of estimating temperature of an electric motor while repressing an increase in manufacturing cost, and a brake device.

One embodiment of the invention provides temperature detecting portions disposed on a control board that controls driving of an electric motor at least at two locations that differ in temperature change tendency.

The one embodiment of the invention makes it possible to estimate the temperature of the electric motor while repressing an increase in manufacturing cost.

DESCRIPTION OF EMBODIMENTS

Embodiments of the invention will be discussed with reference to the attached drawings.

Figure 1:
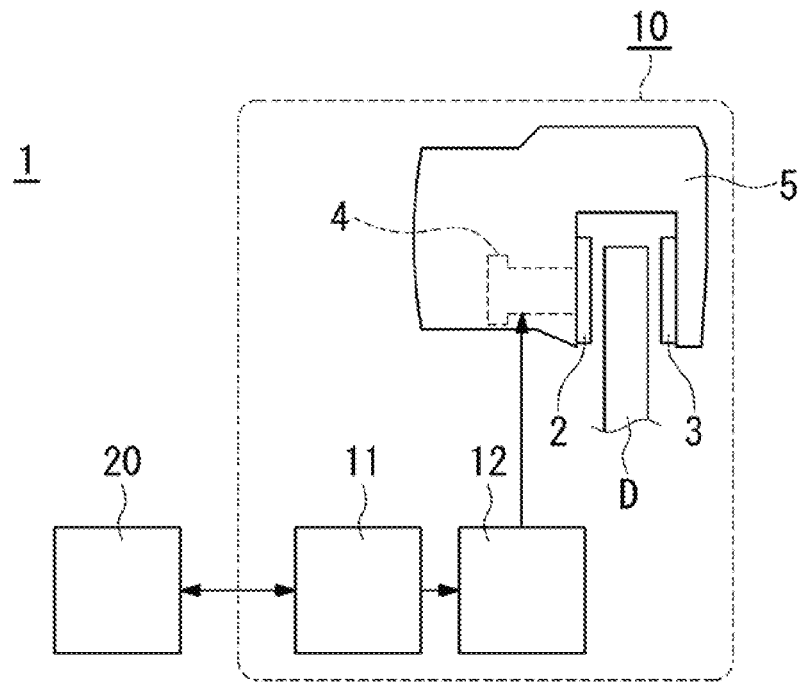
FIG. 1 is a block diagram showing a major part of a brake device according to a first embodiment of the invention.
Figure 2:
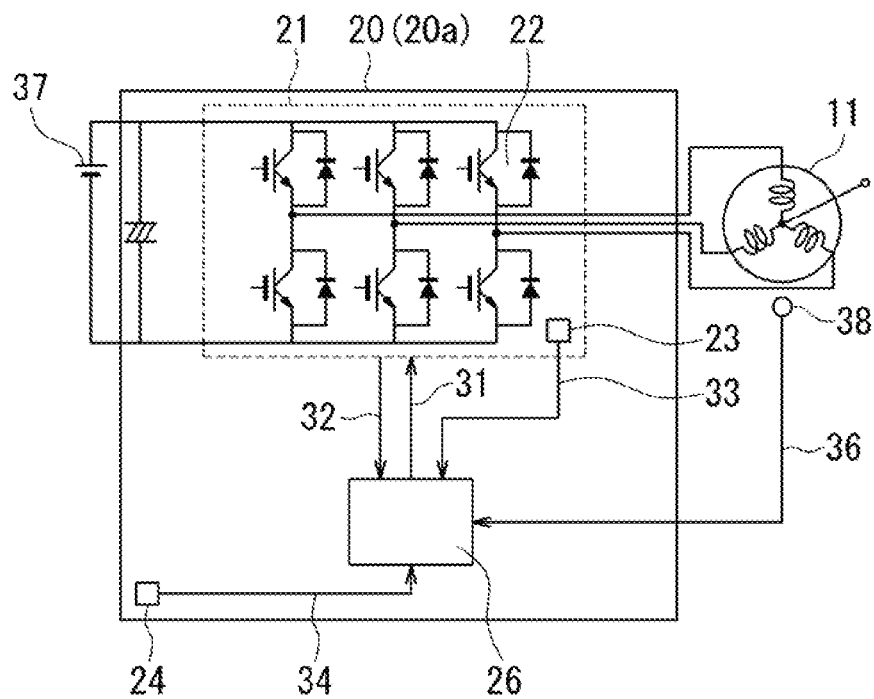
FIG. 2 shows a major part of a motor control device and of an electric motor in the brake device of FIG. 1.

FIG. 1 is a block diagram showing a major part of an electric brake device 1 according to a first embodiment of the invention. FIG. 2 is a block diagram showing a major part of a motor control device 20 in the electric brake device 1 of FIG. 1. The electric brake device 1 is a braking device that imparts a braking force to each wheel by squeezing a disc D that rotates with each wheel, not shown, of a vehicle. As illustrated in FIG. 1, the electric brake device 1 comprises a brake mechanism 10 with respect to each wheel that is braked by each corresponding electric brake device 1. The brake mechanism 10 includes brake pads 2 and 3 pressed against the disc D and a piston 4 that moves the brake pads 2 and 3. The brake mechanism 10 further includes an electric motor 11 and a rotation-linear motion conversion mechanism 12 that converts rotation of the electric motor 11 into linear motion and transmits the linear motion to the piston 4.

Since the electric brake device 1 comprises the brake mechanism 10 with respect to each wheel braked by the electric brake device 1 as mentioned, there are typically provided a plurality of brake mechanisms 10 (for example, four brake mechanisms 10 if the vehicle is a four-wheel vehicle). For the sake of clarity of the drawings and the description, the electric brake device 1 will be discussed here in relation chiefly to one of the brake mechanisms 10 and constituent elements thereof. The matters discussed in relation to one brake mechanism 10 are applicable to any other brake mechanisms, unless otherwise clearly noted.

The electric brake device 1 further comprises a motor control device 20 that controls operation of the electric motor 11. In FIG. 1, the electric motor 11, the rotation-linear motion conversion mechanism 12, and the control device 20 are illustrated outside a caliper 5 as separate blocks from the caliper 5. The drawing simply shows the electric motor 11, the rotation-linear motion conversion mechanism 12, and the control device 20 as functional blocks in a schematic way and is not intended to limit the spatial arrangement of the constituents 11, 12 and 20. Generally in the electric brake device 1, the electric motor 11 and the rotation-linear motion conversion mechanism 12 are disposed in the caliper 5 together with the piston 4. Alternatively, the control device 20 is also disposed in the caliper 5.

The brake mechanism 10 according to the first embodiment may include a freely-selected constituent element (for example, a deceleration mechanism that decelerates the rotation of the electric motor 11) suitable for functioning as a braking device that imparts a braking force to each wheel by squeezing the disc D that rotates with the wheel.

As illustrated in FIG. 2, the motor control device 20 includes a motor driving portion 21 and a controller 26 which are mounted on a control board 20a provided to the motor control device 20 (in FIG. 2, solid lines indicating the motor control device 20 further indicate the control board 20a included in the motor control device 20). In the electric brake device 1, the electric motor 11 comprises, for example, a three-phase synchronous motor. Correspondingly, the motor driving portion 21 comprises a three-phase inverter device that converts DC power supplied to the motor driving portion 21 through a power source 37 into three-phase AC power and outputs the three-phase AC power to the electric motor 11. The controller 26 outputs to the motor driving portion 21 a switch control signal 31 for controlling the ON/OFF of a semiconductor switch element (comprising a MOS-FET, for example) 22 that forms the three-phase inverter device. The motor driving portion 21 controls the driving of the electric motor 11 through pulse width modulation (PWM) control in accordance with the switch control signal 31.

In the electric brake device 1, the electric motor 11 is provided with a rotating position detecting portion 38. A rotating position signal 36 corresponding to a rotating position of the electric motor 11 is inputted into the controller 26 of the motor control device 20 from the rotating position detecting portion 38. A current signal 32 corresponding to motor driving current (winding current) of each phase is also inputted into the controller 26 from the motor driving portion 21. The controller 26 is so configured as to capable of implementing vector control of rotating speed of the electric motor 11 in accordance with the foregoing information.

A first temperature detecting portion 23 and a second temperature detecting portion 24 comprising, for example, thermostats are mounted on the control board 20a of the motor control device 20. Temperature signals 33 and 34 are inputted into the controller 26. The temperature signals 33 and 34 correspond to temperatures measured by the first and second temperature detecting portions 23 and 24, respectively. The first temperature detecting portion 23 is disposed in a heat-generating portion on the control board 20a of the motor control device 20. The second temperature detecting portion 24 is disposed on a non-heat-generating portion on the control board 20a of the motor control device 20 at a location away from the heat-generating portion.

The heat-generating portion is a specific or local area on the control board 20a including a place on which a component that generates heat when operated is mounted. The component is typically a component relatively large in heat-generation amount. The non-heat-generating portion is a specific or local area on the control board 20a, on which a component that generates heat when operated is not mounted. If there is any component mounted on the non-heat-generating portion, the component is relatively small in heat-generation amount.

One of typical heat-generating portions in the motor control device 20 is the motor driving portion 21, or more specifically, a specific or local area including the semiconductor switch element 22 as a heat-generating component. In an example illustrated in FIG. 2, the first temperature detecting portion 23 is disposed in immediate proximity to the semiconductor switch element 22. In that sense, FIG. 2 shows an example where the first temperature detecting portion 23 is disposed in the heat-generating portion. The heat-generating portion of the motor control device 20, however, is not limited to what is shown in FIG. 2. For example, the area including the controller 26 may be considered as a heat-generation portion. Furthermore, if a pre-driver, not shown, for the inverter device is mounted on the control board 20a, an area including the pre-driver may also be considered as a heat-generating portion. According to the invention, the location at which the first temperature detecting portion 23 is disposed is properly decided in consideration of conditions of component mounting on the control board 20a and the like. The first temperature detecting portion 23 may be arranged near the heat-generating portions mentioned above.

In the example illustrated in FIG. 2, the second temperature detecting portion 24 is disposed in an edge portion of the control board 20a of the motor control device 20. In this example, the specific or local area in which the second temperature detecting portion 24 is disposed is assumed to be a non-heat-generating portion in terms that no component that generates heat when operated or preferably no component whatsoever is mounted on the specific area. In addition, the specific area in which the second temperature detecting portion 24 is disposed is located away from all the heat-generating portions including the motor driving portion 21, the controller 26 and the like and is preferably farthest away from all the heat-generating portions.

The control board 20a of the motor control device 20 is generally increased in temperature due to actuation of the motor control device 20. The resulted temperature is not even across the control board 20a. Temperature distribution during the actuation of the motor control device 20 is locally uneven depending on heat generation characteristics of the components mounted on the control board 20a at their respective locations or depending on other factors. In such a temperature distribution, the heat-generating portions and areas close to the heat-generating portions are areas indicating relatively high temperature, and the non-heat-generating portions and areas located away from the heat-generating portions are areas indicating relatively low temperature.

The controller 26 may be connected to a vehicle data bus, not shown, to thereby send and receive a variety of information including information necessary for motor drive control and temperature estimation discussed later to and from each other and/or another electronic control device (ECU) through communication via the vehicle data bus.

The controller 26 is preferably configured as a publicly-known microcomputer system provided with a CPU (Central Processing Unit), a ROM (Read Only Memory), a RAM (Random Access Memory), an I/O (Input/Output) interface, and the like. The controller 26 may instead partially or entirely comprise freely-selected proper hardware or software or a combination of the hardware and the software as long as the controller 26 is capable of implementing the motor drive control and the temperature estimation which will be discussed later in detail.

In the electric brake device 1 thus configured, the rotation of the electric motor 11 driven by the motor driving portion 21 under the control of the controller 26 is converted into linear motion by the rotation-linear motion conversion mechanism 12 of the brake mechanism 10. The linear motion transmits thrust to the piston 4 and causes the brake pads 2 and 3 moved by the piston 4 to press the disc D, thereby generating a braking force.

Figure 3:
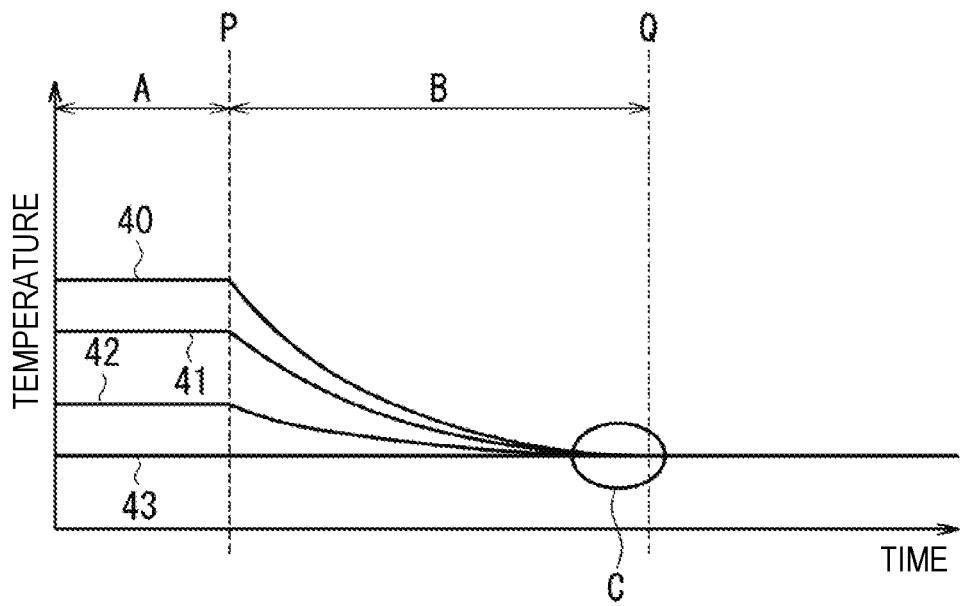
FIG. 3 is a graph showing temporal changes of temperatures obtained from first and second temperature detecting portions in the brake device of FIG. 1 with ambient temperature and motor temperature.

The following discussion explains the estimation of temperature of the electric motor 11 (that is, winding temperature of the electric motor 11) in the electric brake device 1 with reference to FIG. 3 in addition to FIGS. 1 and 2. The controller 26 of the motor control device 20 is either configured to previously store a temperature coefficient α of winding material of the electric motor 11 and a torque constant of the electric motor 11 or capable of obtaining, as necessary, the temperature coefficient α of winding material of the electric motor 11 and the torque constant of the electric motor 11 from another electronic control device installed in the vehicle.

FIG. 3 is a graph showing a temporal change in temperature 41 obtained from the first temperature detecting portion 23 and in temperature 42 obtained from the second temperature detecting portion 24 with assumed ambient temperature 43 and winding temperature 40 of the electric motor 11.

In the electric brake device 1, initial resistance Ri of the winding of the electric motor 11 is first obtained as below. An interval A shown in FIG. 3 is a state in which the motor control device 20 is in operation. During the interval A, the temperatures 41 and 42 of the control board 20a of the motor control device 20 are generally higher than the ambient temperature 43 due to heat generation that is caused by operating the components mounted on the control board 20a. According to an example shown in FIG. 3, the winding temperature 40 of the electric motor 11 is assumed to be higher than the temperatures 41 and 42 of the control board 20a. Since the first temperature detecting portion 23 is disposed in the heat-generating portion on the control board 20a, and the second temperature detecting portion 24 is disposed in the non-heat-generating portion on the control board 20a, the temperature 41 is higher than the temperature 42.

At a time point P, the vehicle stops, and an ignition is turned off. During an interval B after the time point P, the operation of the motor driving portion 21 and therefore the energization of the electric motor 11 are suspended until an initial resistance obtaining operation is carried out, while the energization of the motor control device 20 itself is continued. Since the operation of the motor driving portion 21 is suspended, it is assumed that the temperatures 41 and 42 are decreased toward the ambient temperature 43 and at the same time that the winding temperature of the electric motor 11, the energization of which is suspended, is also decreased toward the ambient temperature 43.

The controller 26 continuously monitors difference between the temperatures 41 and 42 during the interval B and determines whether the difference becomes equal to or smaller than a predetermined threshold value. The predetermined threshold value is set to such a value that the temperatures 41 and 42 are considered to substantially agree with each other (for example, within a margin of error) if the difference between the temperatures 41 and 42 is equal to or smaller than the threshold value. If the temperature 41 obtained from the first temperature detecting portion 23 and the temperature 42 obtained from the second temperature detecting portion 24 agree with each other when the first and second temperature detecting portions 23 and 24 are disposed in two locations that differ in temperature change tendency, this means that the temperatures 41 and 42 both reach the ambient temperature 43. This leads to an assumption that the winding temperature of the electric motor 11 also reaches the ambient temperature 43 after a lapse of a sufficient amount of time before reaching the ambient temperature 43.

At this point, the following equation is established.

Temperature 41=temperature 42=ambient temperature 43=winding temperature 40 of the electric motor 11 (1)

Referring to the graph of FIG. 3, the controller 26 determines that the difference between the temperature 41 and the temperature 42 is equal to or smaller than the predetermined threshold value at a time point in an area C. The controller 26 then carries out the following initial resistance obtaining operation. In this operation, the controller 26 controls the motor driving portion 21 so as to zero q-axis current of the electric motor 11 and energize d-axis only (hereinafter, also simply referred to as d-axis energization) through the switch control signal 31, to thereby energize winding current without rotating the electric motor 11. The controller 26 calculates the initial resistance Ri of the winding of the electric motor 11 according to the following equation (2) on the basis of the inputted winding current (current signal 32).

$Ri$=inverter voltage×DUTY/winding current (2)

where the inverter voltage is source voltage of the power source 37; DUTY is a duty ratio in the ON/OFF operation of the semiconductor switch element 22 of the motor driving portion 21; and the winding current is a current value corresponding to the current signal 32.

The controller 26 stores in a non-volatile memory portion the calculated initial resistance Ri and initial temperature Ti that is temperature expressed by the equation (1). The non-volatile memory portion is provided to the controller 26 or another electronic control device installed in the vehicle. After the initial resistance obtaining operation is finished, the energization of the motor control device 20 is suspended at a time point Q.

The winding temperature of the electric motor 11 is estimated as described below at a freely-selected time point after the initial resistance obtaining operation is carried out.

First, resistance Rc of the winding at the freely-selected time point (hereinafter, also referred to as present resistance Rc) is calculated according to an equation (3).

$Rc$=(inverter voltage−torque constant×rotating speed)×DUTY/winding current (3)

where the inverter voltage is the source voltage of the power source 37; the DUTY is the duty ratio in the ON/OFF operation of the semiconductor switch element 22 of the motor driving portion 21; the winding current is a current value corresponding to the current signal 32; the torque constant is a torque constant specific to the electric motor 11; and the rotating speed is the rotating speed of the electric motor 11 at the point of the estimation, which is obtained on the basis of the rotating position signal 36.

Needless to say, if the rotating speed is set to zero, the equation (3) is applicable to a situation where the rotation of the electric motor 11 is suspended. When the present resistance Rc is to be obtained while the rotation of the electric motor 11 is suspended, for example, as in a situation where the vehicle is halted, it is preferable that the current value of the winding current be obtained by driving the electric motor 11 through the d-axis energization without rotating the electric motor 11 in a similar manner to when the initial resistance obtaining operation is carried out.

The controller 26 then obtains estimated present winding temperature Tc of the electric motor 11 according to the following equation (4) on the basis of the calculated present resistance Rc of the winding, the stored initial resistance Ri of the winding and the stored initial temperature Ti of the winding, and the stored temperature coefficient α of the winding material.

$Tc=(Rc-Ri)/(\alpha \times Ri)+Ti$ (4)

The following is an example of the estimated present winding temperature Tc on the condition that the winding material is copper (α=0.393%/° C.) and that the initial temperature Ti is 25° C. During the initial resistance obtaining operation, if the inverter voltage and the duty ratio are 12 V and 50%, respectively, and if the winding current at this point of time is 30 A, the initial resistance Ri of the winding is 0.2Ω according to the equation (2). At the point of the temperature estimation, if the inverter voltage, the duty ratio, and a counter-electromotive force of the electric motor 11 (that is, torque constant×rotating speed) are 12 V, 100%, and 3 V, respectively, and if the winding current is 30 A, the present resistance Rc of the winding is 0.3Ω according to the equation (3). In such a case, the estimated present temperature Tc of the winding is approximately 152° C. according to the equation (4).

The initial resistance obtaining operation may be preferably carried out once in an initial stage or more than once, as necessary, in the vehicle's life cycle. If the initial resistance obtaining operation is carried out more than once, latest initial resistance Ri and latest initial temperature Ti may be used to estimate the present temperature Tc of the winding. It is also possible instead, for example, to take averages from a plurality of initial resistances Ri and initial temperatures Ti to obtain respective representative values, to thereby use the representative values.

Two temperature detecting portions, namely the first and second temperature detecting portions 23 and 24, are disposed on the control board 20a of the motor control device 20. According to the invention, however, the temperature detecting portions may comprise temperature detecting portions that correspond to respective two or more locations that differ in temperature change tendency (for example, two or more heat-generating portions and/or two or more non-heat-generating portions).

According to conventional brake devices, a screw-type thermistor is fixed to the housing of an electric motor to estimate the winding temperature of the electric motor. The winding temperature of the electric motor is estimated from housing temperature obtained by the thermistor, a constant obtained during heat generation/heat dissipation, an integrated value of winding current, and the like. The foregoing method has a problem that the number of components to be disposed in a limited space, such as a wheelhouse, is increased, that it is necessary to provide a physical connection point for temperature measurement at a location like an unsprung area which has to satisfy high vibration requirements, and that a complicate logic is needed for estimating the temperature (winding temperature) of the electric motor from temperature near the electric motor.

For example, the method described in Patent Literature 1 requires initial winding resistance of an electric motor to be previously measured with respect of each product by using a sensitive measurement device for measuring low-value resistance, which incurs an increase in the number of steps of manufacturing process and therefore an increase in manufacturing cost.

By contrast to Patent Literature 1, the brake device (electric brake device 1) and the motor control device (motor control device 20) according to the invention include the temperature detecting portions (first and second temperature detecting portions 23 and 24) at least at two locations that differ in temperature change tendency on the control board 20a that controls the driving of the electric motor 11. The invention therefore does not require any special temperature sensor to be fixed directly near the electric motor. In addition, the invention enables the temperature (winding temperature) of the electric motor 11 to be more directly estimated, taking into account a change caused by actuation of the electric motor 11, without requiring a complicate logic for estimating the temperature (winding temperature) of the electric motor from the temperature near the electric motor. The invention thus makes it possible to estimate the temperature (winding temperature) of the electric motor 11 with high accuracy through a more simple and compact logic.

The brake device (electric brake device 1) and the motor control device (motor control device 20) according to the present embodiment estimate the temperature of the electric motor 11 in accordance of the ambient temperature obtained on the basis of outputs of the temperature detecting portions (first and second temperature detecting portions 23 and 24). This eliminates the necessity of previously measuring the winding resistance of the electric motor with respect to each product by using a sensitive measurement device for measuring low-value resistance during the process of manufacturing the electric brake device 1 and/or the motor control device 20, which represses or solves an increase in the number of steps of manufacturing process and therefore an increase in manufacturing cost.

In the brake device (electric brake device 1) and the motor control device (motor control device 20) according to the present embodiment, the first temperature detecting portion 23 is disposed in the heat-generating portion on the control board 20a or near the heat-generating portion, and the second temperature detecting portion 24 is disposed in the non-heat-generating portion of the control board 20a or at a location away from the heat-generating portion of the control board 20a. This makes it possible to estimate the ambient temperature (that is, the initial temperature of the electric motor 11) and therefore the initial temperature (winding temperature) of the electric motor 11 with high accuracy as such a value that the temperatures obtained from the first and second temperature detecting portions 23 and 24 converge over time, which enables an accurate estimation of the present temperature (winding temperature) of the electric motor 11. This makes it possible to reliably carry out an operation for protecting the electric motor 11 which is needed when temperature is high as in a gradual output decrease procedure or the like.

In the brake device (electric brake device 1) and the motor control device (motor control device 20) according to the present embodiment, the winding resistance of the electric motor 11 is measured without rotating the electric motor 11 through the d-axis energization when the vehicle is halted (including the situation where the initial resistance obtaining operation is carried out). This makes it possible to measure the winding resistance (for example, the initial resistance Ri and the present resistance Rc which is obtained when the vehicle is halted) without giving an unpleasant feeling to a user of the vehicle and with high accuracy (for example, without being affected by torque constant variation).

Figure 4:
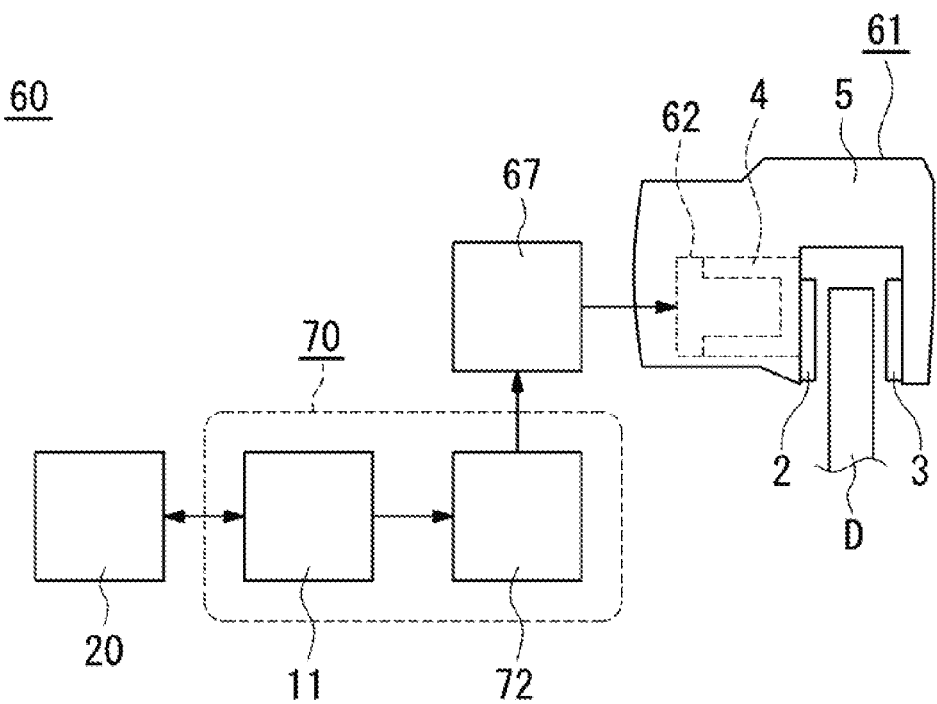
FIG. 4 is a block diagram showing a major part of a brake device according to a second embodiment of the invention.

The following discussion explains a brake device 60 according to a second embodiment of the invention with reference to FIG. 4 with a main focus on differences from the first embodiment. Components and portions similar or corresponding to those of the first embodiment are referred to by the same terms and reference signs as in the first embodiment.

The brake device 60 is a hydraulic braking device that imparts a braking force to each wheel by squeezing a disc D that rotates with each wheel, not shown, of a vehicle. The brake device 60 includes a brake mechanism 61 including brake pads 2 and 3 pressed against the disc D, and a piston 4 that is slidably disposed in an inner periphery of a cylinder 66 of a caliper 5 and moves the brake pads 2 and 3. The brake mechanism 61 is provided to each wheel braked by the brake device 60.

The brake device 60 further includes a master cylinder 67 that generates hydraulic pressure supplied into the cylinder 66 of the caliper 5 and an electric booster device 70 that transmits to the master cylinder 67. The electric booster device 70 includes an electric motor 11 that drives a booster piston, not shown, capable of adjusting the hydraulic pressure in the master cylinder 67 and a rotation-linear motion conversion mechanism 72 that converts the rotation of the electric motor 11 into linear motion and transmits the linear motion to the booster piston. The electric booster device 70 is capable of implementing various brake controls, such as regenerative cooperative control, brake assist, and automatic brake, using the electric motor 11 that is driven-controlled by a motor control device 20 described later in consort with depression of a brake pedal, not shown, or regardless of operation of the brake pedal.

The brake device 60 includes the motor control device 20 that controls operation of the electric motor 11. The electric motor 11 driven under the drive-control by the motor control device 20 is used to generate the hydraulic pressure in the master cylinder 67 and therefore generate the braking force in the brake mechanism 61 of each wheel.

The electric motor 11 of the brake device 60 is similar to the corresponding constituent element of the electric brake device 1 of the first embodiment. The motor control device 20 in the brake device 60 functions similarly to the motor control device 20 of the electric brake 1 of the first embodiment in terms of the driving of the electric motor 11.

With the above-discussed configuration, the brake device 60 and the motor control device 20 provide the same operation and advantageous effects as those discussed above in relation to the electric brake device 1 and the motor control device according to the first embodiment.

The control device 20 of the electric motor 11 according to the invention has been discussed in relation to the brake device of the vehicle. The electric motor control device according to the invention, however, is not limited to what has been discussed above. On the contrary, the electric motor control device according to the invention is applicable, for example, to other in-vehicle systems, such as an electric power train device and an electric power steering device, and further applicable to other devices which are not installed in the vehicle. The invention is further applicable to systems in which the electric motor 11 and the control device 20 are arranged away from each other.

The invention is not limited to the embodiments discussed above and may be modified in various ways. For example, the embodiments describe the invention in detail to facilitate the understanding of the invention and do not necessarily have to include all the configurations mentioned above. It is possible to partially replace the configuration of one of the embodiment with the configuration of the other embodiment and also incorporate the configuration of one of the embodiments into that of the other embodiment. The configuration of each of the embodiments may be partially combined or replaced with the configuration of the other embodiment and also may be deleted.

The present application claims priority under Japanese Patent Application No. 2018-060443 filed on Mar. 27, 2018. The entire disclosure of Japanese Patent Application No. 2018-060443 filed on Mar. 27, 2018 including the description, claims, drawings and abstract, is incorporated herein by reference in its entirety.

REFERENCE SIGN LIST

1: Electric brake device (brake device)
2, 3: Brake pad (braking member)
4: Piston
11: Electric motor
10, 61: Brake mechanism
20: Motor control device
20a: Control board
23: First temperature detecting portion (temperature detecting portion)
24: Second temperature detecting portion
43: Ambient temperature
D: Disc (braked member)

The invention claimed is:

1. An electric motor control device comprising:
a control board configured to control driving of an electric motor;
a first temperature detecting portion disposed on the control board; and
a second temperature detecting portion disposed on the control board, wherein:
the first temperature detecting portion and the second temperature detecting portion are respectively disposed on the control board at locations thereof that differ in temperature change tendency;
the first temperature detecting portion is disposed on a heat-generating portion on the control board of the motor control device, and the second temperature detecting portion is disposed on a non-heat-generating portion on the control board of the motor control device at a location away from the heat-generating portion;
the electric motor control device is configured to estimate a temperature of the electric motor based on an ambient temperature obtained from outputs of the first and second temperature detecting portions and based on a winding resistance of the electric motor;
the outputs differing in temperature change tendency in a first temperature obtained from the first temperature detecting portion and temperature change tendency in a second temperature obtained from the second temperature detecting portion; and
the ambient temperature is obtained with energization of the electric motor being suspended and energization of the electric motor control device being continued during an interval in which a vehicle on which the electric motor control device is configured to be mounted stops and an ignition is turned off.

2. The electric motor control device according to claim 1, wherein:
the electric motor control device is further configured to estimate temperature of the electric motor based on ambient temperature obtained from outputs of the temperature detecting portions and control the electric motor.

3. A brake device comprising:
an electric motor configured to press a braking member against a braked member to generate a braking force; and
an electric motor control device including:
a control board configured to control driving of the electric motor;
a first temperature detecting portion disposed on the control board and configured to detect a first temperature; and
a second temperature detecting portion disposed on the control board at a location where a temperature differs in change tendency from the first temperature detected by the first temperature detecting portion,
wherein:
the first temperature detecting portion is disposed on a heat-generating portion on the control board of the electric motor control device, and the second temperature detecting portion is disposed on a non-heat-generating portion on the control board of the electric motor control device at a location away from the heat-generating portion;
the electric motor control device is configured to estimate a temperature of the electric motor based on an ambient temperature obtained from outputs of the first and second temperature detecting portions and based on a winding resistance of the electric motor;
the outputs differing in temperature change tendency in the first temperature obtained from the first temperature detecting portion and temperature change tendency in a second temperature obtained from the second temperature detecting portion; and
the ambient temperature is obtained with energization of the electric motor being suspended and energization of the electric motor control device being continued during an interval in which a vehicle on which the electric motor control device is configured to be mounted stops and an ignition is turned off.

* * * * *